(12) United States Patent
Wang et al.

(10) Patent No.: US 8,109,667 B2
(45) Date of Patent: Feb. 7, 2012

(54) BACKLIGHT MODULE WITH IMPROVED BASE STRUCTURE AND METHOD FOR MANUFACTURING THE SAME

(75) Inventors: Ping-Fu Wang, Hsin-Chu (TW);
Wei-Chih Chen, Hsin-Chu (TW);
Yung-Chih Liu, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 343 days.

(21) Appl. No.: 12/394,450

(22) Filed: Feb. 27, 2009

(65) Prior Publication Data

US 2009/0219724 A1 Sep. 3, 2009

(30) Foreign Application Priority Data

Feb. 29, 2008 (TW) .............................. 97106963 A

(51) Int. Cl.
*F21V 7/04* (2006.01)
(52) U.S. Cl. .......... 362/633; 362/632; 362/97.1; 349/58
(58) Field of Classification Search .................... 349/58; 362/97.1–97.3, 632–634, 362
See application file for complete search history.

(56) References Cited

U.S. PATENT DOCUMENTS

| 6,801,268 | B2 * | 10/2004 | Huang et al. | ..................... 349/58 |
| 7,911,774 | B2 * | 3/2011 | Nakanishi et al. | ............... 349/58 |
| 2002/0105605 | A1 | 8/2002 | Huang et al. | |
| 2007/0127271 | A1 | 6/2007 | Kim | |

FOREIGN PATENT DOCUMENTS

| CN | 1821852 | 8/2006 |
| CN | 1821852 A | 8/2006 |
| JP | 2004240239 A | 8/2004 |
| KR | 100732998 | 6/2007 |
| TW | 540553 | 7/2003 |
| TW | 200401143 A | 1/2004 |

OTHER PUBLICATIONS

Chinese language Office Action dated Jun. 5, 2009.
English language translation of abstract and pertinent parts of KR 100732998.
English language translation of abstract of CN 1821852.
English translation of abstract and pertinent parts of CN 1821852 A.
English translation of abstract and pertinent parts of JP 2004240239 A.
Taiwan Office Action dated Nov. 16, 2011.

* cited by examiner

*Primary Examiner* — Stephen F Husar
(74) *Attorney, Agent, or Firm* — Thomas, Kayden, Horstemeyer & Risley, LLP

(57) ABSTRACT

A backlight module and a method for manufacturing a base thereof are provided. The backlight module base includes a back plate and a frame. The back plate has a plate body and at least one sidewall, which includes a wall body and a folding structure bending from the top of the wall body. The folding structure, the plate body, and the wall body together enclose a groove. The frame is formed on the plate body and adjacent to an inner surface of the sidewall. A part of the frame is embedded into the groove. The engagement between the frame and the groove increases the contact area between the frame and the back plate to improve the connection strength. In addition, the folding design of the sidewall increases the rigidity of the whole structure.

24 Claims, 17 Drawing Sheets

BACKLIGHT MODULE WITH IMPROVED BASE STRUCTURE AND METHOD FOR MANUFACTURING THE SAME

BACKGROUND OF THE INVENTION

1. Field of the Invention

This invention relates to a backlight module, a base structure used in the backlight module, and a manufacturing method of the base structure. More particularly, this invention relates to a back plate of the backlight module base structure, a structure therefore for a frame to be disposed thereon, and a method for manufacturing the same.

2. Description of the Prior Art

Due to the advantages of thinness, lightness and portability of the LCD panels and relatively low radiation comparing to CRT display, the demand for LCD panels has increased rapidly in recent years. Especially, a backlight module is one of the key parts of LCD panels. With the improvement of the manufacturing technology of LCD displays, the backlight modules are developed into thinner, brighter at lower cost. In order to maintain the competence of LCD display in the market, developing and designing a better backlight module should be one of the goals.

FIG. 1 schematically illustrates a conventional backlight module. As shown in FIG. 1, the backlight module includes a metal back plate 50, a rubber frame 70, a light source module 20 and optical films 30. The metal back plate 50 is disposed at the bottom of the backlight module. The rubber frame 70 is disposed on the metal back plate 50 for fixing the light source module 20 and optical films 30 thereon. The more often used light source modules 20 are light-emitting diodes or fluorescent tubes. However, since the products are tended to be thinner and smaller, light-emitting diodes are often used as the light source for smaller backlight modules. Optical films 30 include a light guide plate, brightness enhancement film (BEF) and other films that can adjust the light emitted from the light source module 20 to meet the design need.

However, as the size of consumers' products shrinks, the size of the backlight module also needs to be modified. Take mobile phones for example; since the appearance and the overall volume are taken into consideration, the size of the frame around the display has been gradually decreased. However, while the thickness of the frame of the backlight module is reduced, the strength of the structure is also reduced. Moreover, during the processes of manufacturing and operating, the metal back plate 50 and the rubber frame 70 might become loose or misplaced to affect the strength of the overall structure.

SUMMARY OF THE INVENTION

An object of this invention is to provide a backlight module having a solid connection between the back plate and the frame.

An object of this invention is to provide a backlight module having a sidewall that has better bending strength.

An object of this invention is to provide a method of manufacturing a backlight module base structure with increased connection strength between the back plate and the frame.

The backlight module of this invention includes a base and a light source. The base of the backlight module is disposed at the bottom of the backlight module, and the light source is disposed on the inner surface. The base of the backlight module includes a back plate and a frame. The back plate has a plate body and at least one sidewall, wherein the sidewall is connected to the edge of the plate body. The sidewall has a wall body and a folding structure. The folding structure is formed after bending the wall body inward from the top of the wall body. After bending the wall body inward from the top of the wall body, the folding structure and the plate body enclose a gap. That is, the folding structure, the plate body, and the wall body together enclose a groove. The frame is formed on the plate and is adjacent to the inner side of the sidewall. The back side of the frame that is disposed facing the sidewall is partially inserted into the groove enclosed by the folding structure, the plate body and the wall body. The engagement between the frame and the groove increases the contact area between the frame and the back plate to improve connection strength. Moreover, the folding design of the sidewall increases the rigidity of the whole structure.

The manufacturing method of the base of the backlight module of this invention includes the following steps. First, at least one sidewall is formed on periphery of the plate body, and a portion of the wall body of the sidewall is bent inward from the top to form a folding structure. Meanwhile, a gap is enclosed between the folding structure and the plate body. In other words, the folding structure, the plate body and the wall body together enclose a groove. Next, the frame is formed on the plate body adjacent to the inner surface of the sidewall, and a part of the frame is inserted into the groove. The engagement of the frame and the groove increases the connection strength between the frame and the back plate.

BRIEF DESCRIPTION OF THE DRAWINGS

FIG. 4b is a cross sectional view of the embodiment of FIG. 4a;

DETAILED DESCRIPTION OF THE PREFERRED EMBODIMENT

This invention provides a backlight module, a base used in the backlight module and a manufacturing method thereof. In a preferred embodiment, the backlight module is provided for use in LCDs. However, in other embodiments, the backlight module can also be provided for computer keyboards, mobile phone buttons, bulletin board, and other devices that need plane light sources. Furthermore, this invention includes a liquid crystal display device with the backlight module. In a preferred embodiment, the liquid crystal device includes a color liquid crystal display device. However, in other embodiments, the liquid crystal display device may be a monochrome liquid crystal display device. The liquid crystal display device herein refers to any display devices utilizing liquid crystal panels, including liquid crystal monitors of home LCD televisions, personal computers, and laptop computers, and liquid crystal screens of mobile phones and digital cameras.

Figure 1:
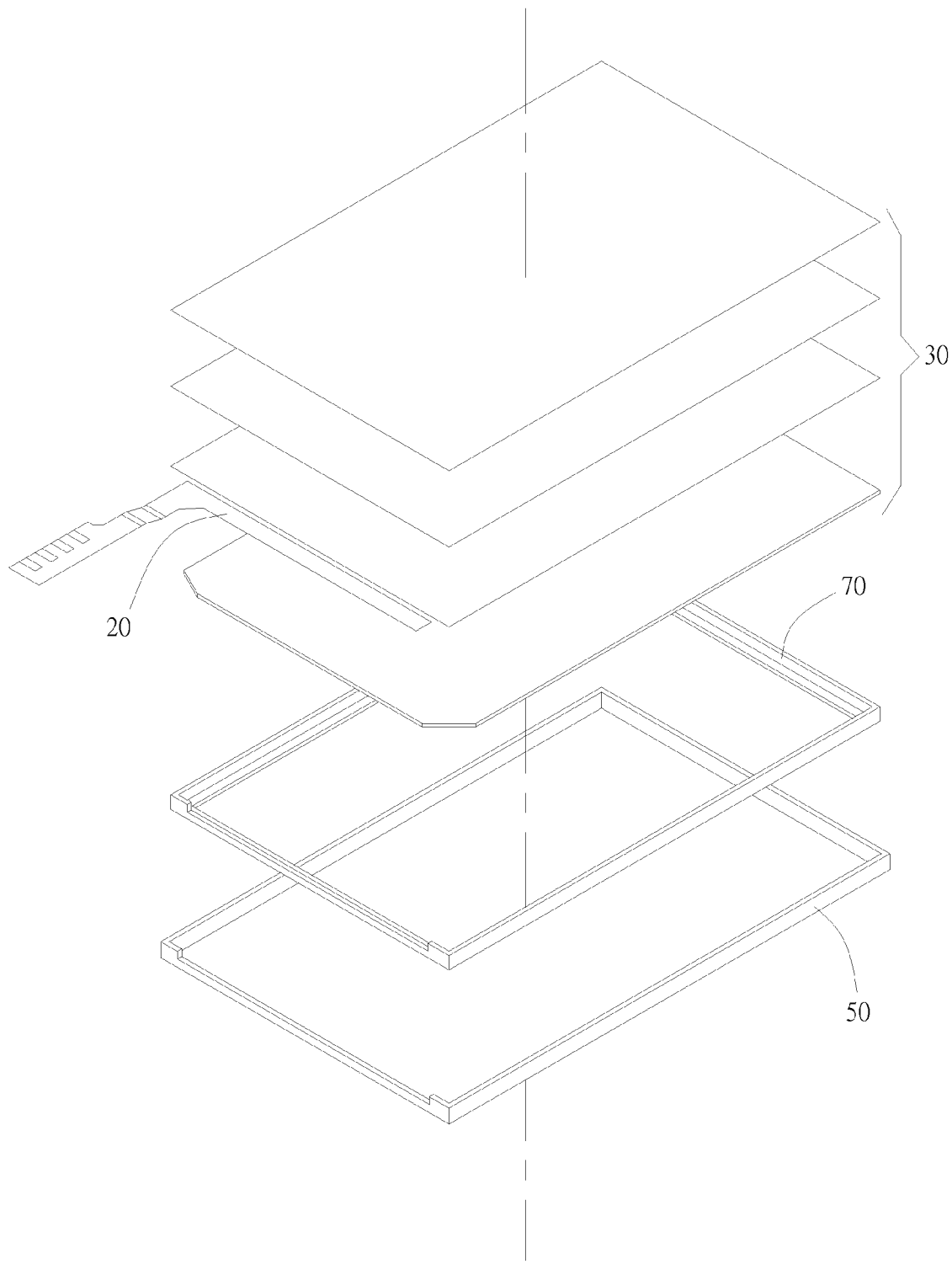
FIG. 1 schematically illustrates a conventional backlight module.
Figure 2:
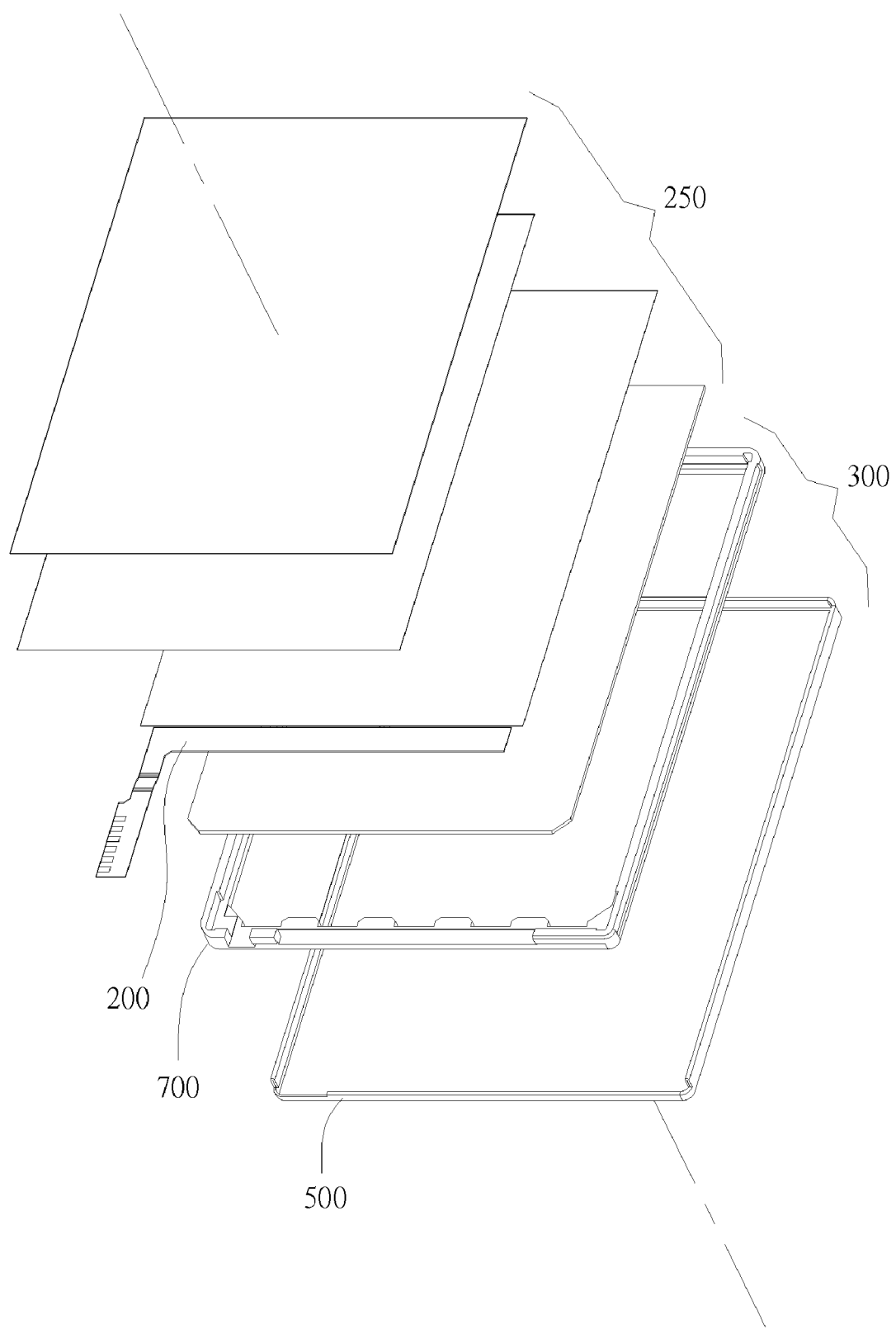
FIG. 2 is an exploded view of a backlight module of this invention.

As shown in FIG. 2, the backlight module of this invention includes a backlight module base 300. A light source 200 is disposed on an inner surface of the backlight module base 300. In a preferred embodiment, the light source 200 preferably consists of LED elements. However, in other embodiments, the light source 200 may consist of fluorescent tubes or other light source elements. Moreover, various optical films 250 or plates may be disposed on top or sides of the light source 200. The optical films 200 may be, for example, a light guide plate, a diffuser plate, a diffusion film, a polarizing film, and a brightness enhancement film for adjusting the output light.

Figure 3A:
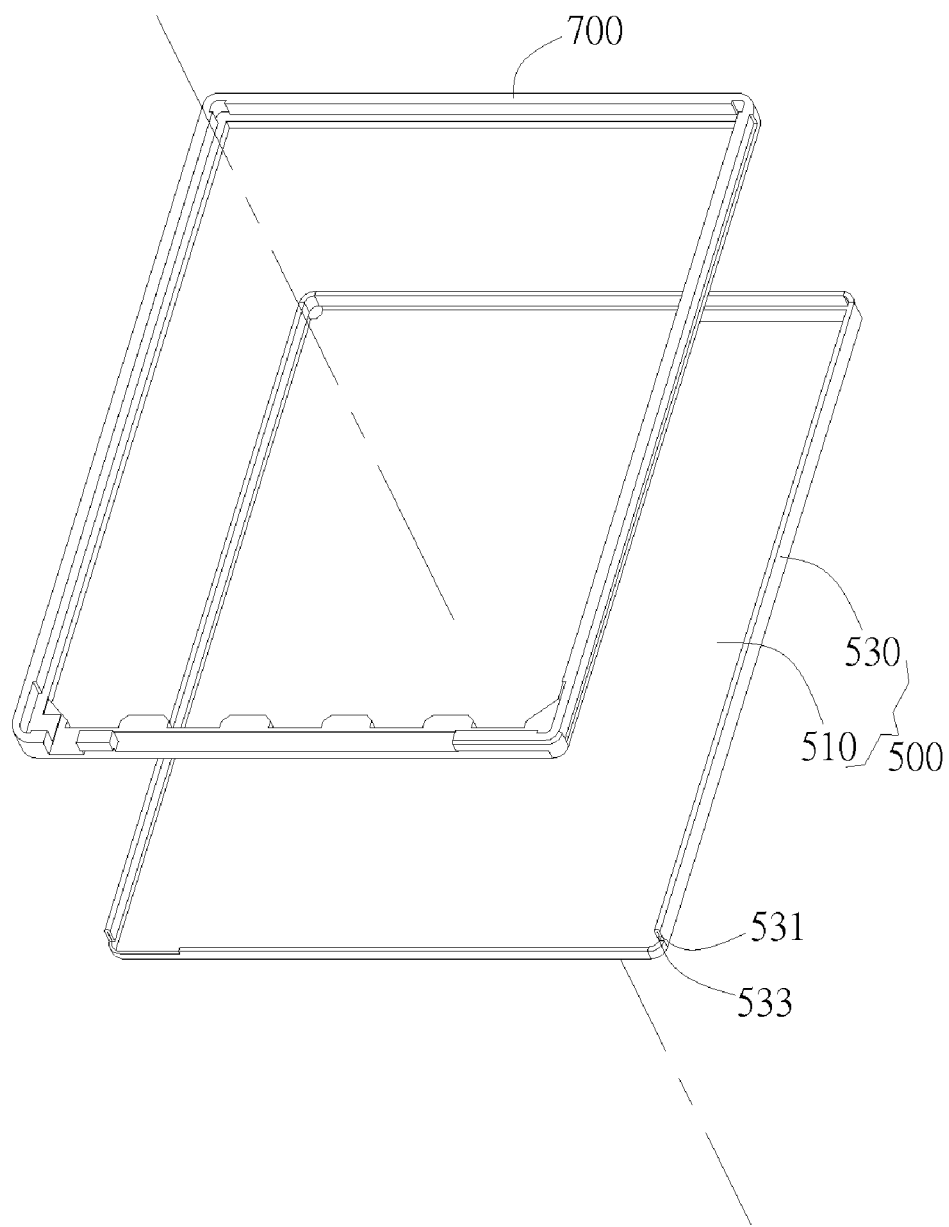
FIG. 3a is an exploded view of a back plate of the backlight module of this invention.

As shown in FIG. 3a, the backlight module base 300 includes a back plate 500 and a frame 700. The back plate 500 is preferably made of metal, such as, galvanized steel, aluminum, stainless steel, or other metal or alloy. However, in other embodiments, the back plate 500 may be made of plastic or other materials. The back plate 500 has a plate body 510 and at least one sidewall 530, wherein the sidewall 530 is connected to periphery of the plate body 510. In this embodiment, the plate body 510 is rectangular with two longer sides and two shorter sides, and the sidewalls 530 are formed on four sides of the plate body 510, respectively. However, in other embodiments, the plate body 510 may be provided with sidewall 530 on only one side or two opposite sides. Furthermore, the plate body 510 may also be square, polygonal, round, or in other shapes.

Figure 3B:
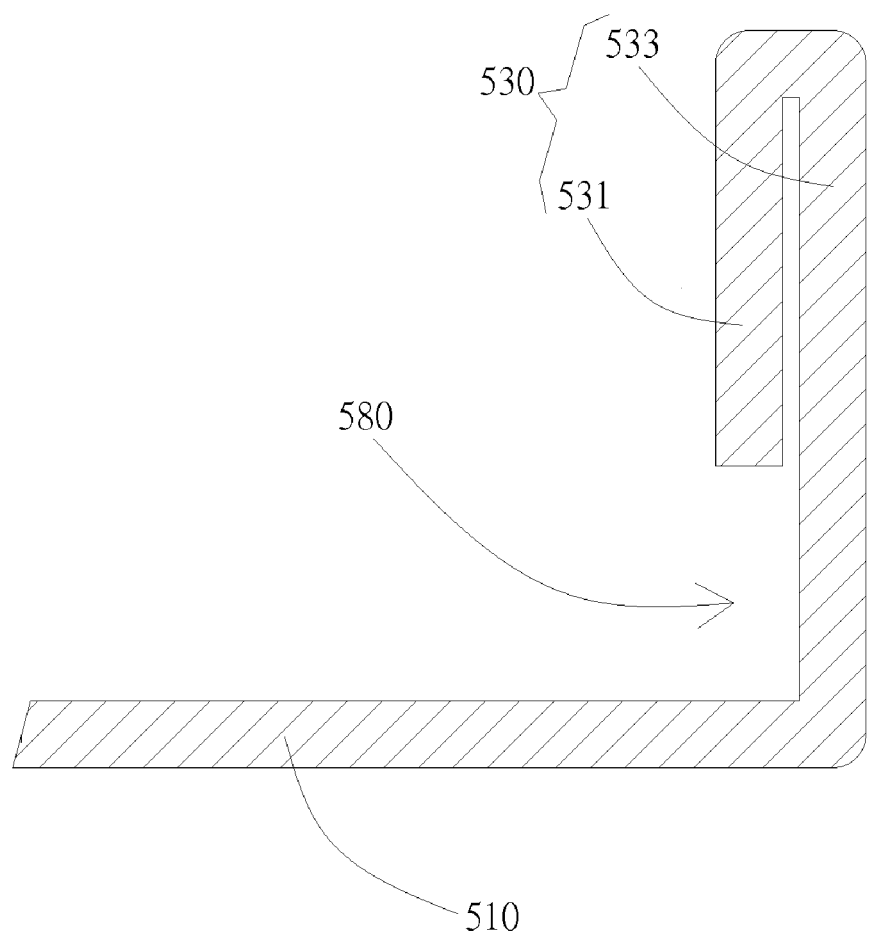
FIG. 3b is a cross-sectional view of the back plate.

As shown in FIG. 3b, the sidewall 530 has a wall body 531 and a folding structure 533. The folding structure 533 is formed by bending the top of the wall body 531 inward. In a preferred embodiment, the wall body 531 is formed by cutting the plate body 510 and bending the plate body 510 upward. Therefore, one end of the wall body 531 is connected to the edge of the plate body 510. As shown in FIG. 3b, the top of the wall body 531 is bent to be parallel to the original wall body 531. Meanwhile, a gap is formed between the folding structure, which is formed by bending the top of the wall body 531 and the plate body 510. In other words, the folding structure 533, the plate body 510 and the wall body 531 together enclose a groove 580. The folding design of the sidewall 530 increases the rigidity of the whole structure.

Figure 4A:
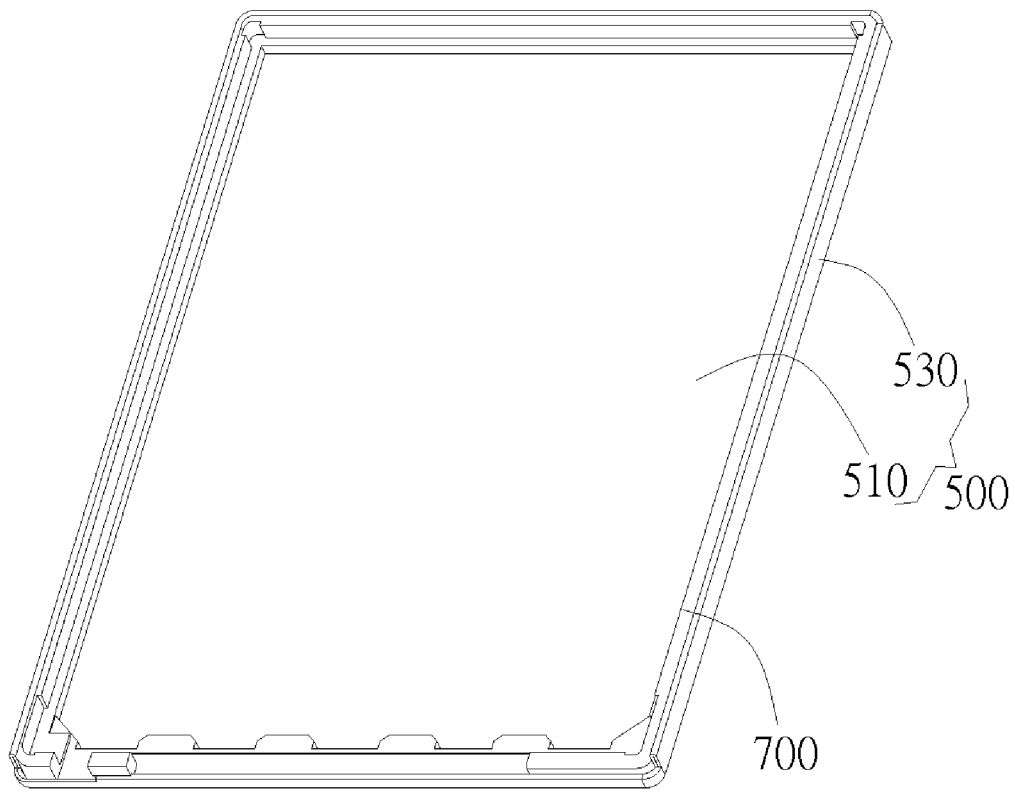
FIG. 4a schematically illustrates an embodiment of the assembly of the back plate and the frame.
Figure 4B:
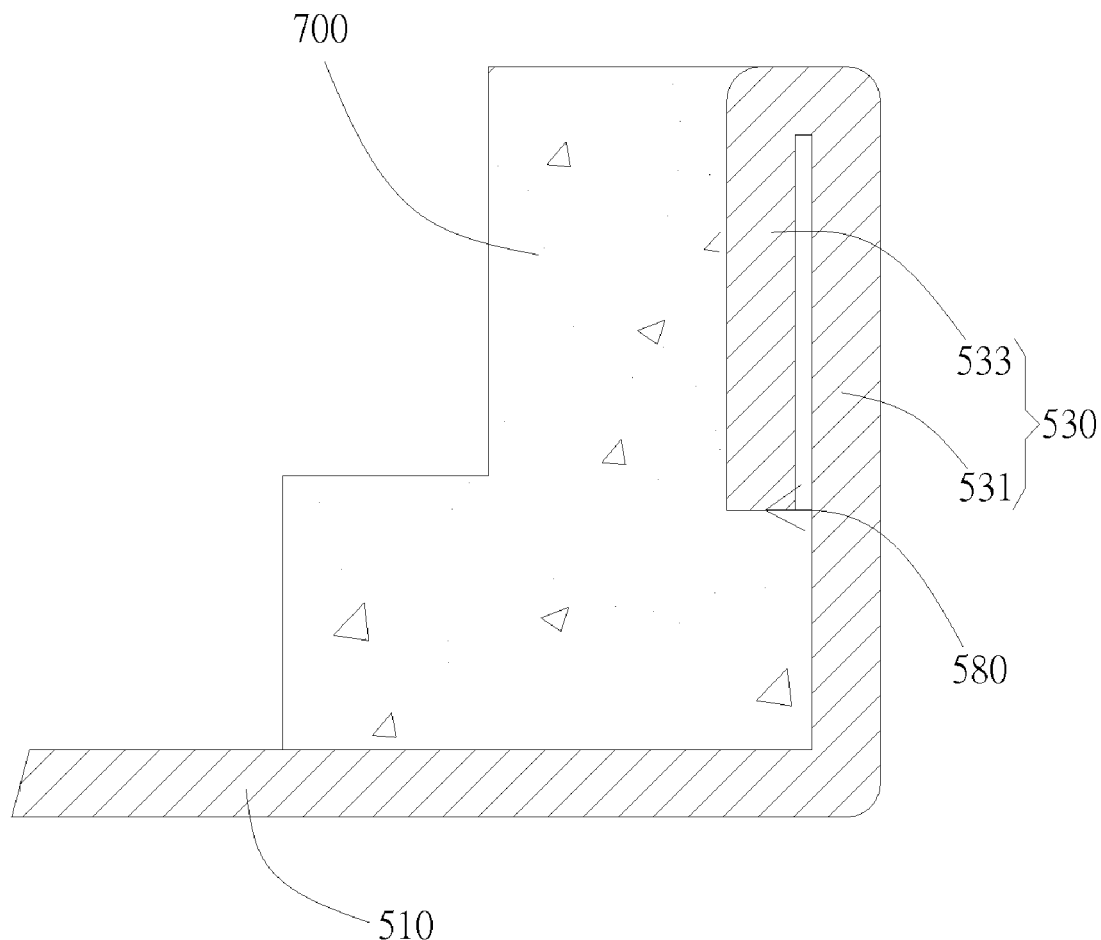

As shown in FIGS. 4a and 4b, a frame 700 is formed on the plate body 510 and adjacent to the inner surface of the sidewall 530. The back side of the frame 700 which faces the sidewall 530 is partially inserted into the groove 580 enclosed by the folding structure 533, the plate body 510 and the wall body 531. In a preferred embodiment, the back side of the frame 700 fills the space of the groove 580 to achieve a better connection. However, in other embodiments, the space of the groove 580 may be partially filled. Moreover, the frame 700 is preferably formed on the back plate 500 by an injection molding process. That is, the back plate 500 is disposed in a mold, and the frame 700 is formed on the back plate 500 in the mold through injection-molding, such that a part of the frame 700 is embedded in the groove 580. In this embodiment, the frame 700 is preferably made of polycarbonate (PC), polystyrene (e.g. ABS), or other materials that can be shaped by molding. However, in other embodiments, the frame 700 may be made first and then be aligned and connected to the back plate 500.

Figure 5:
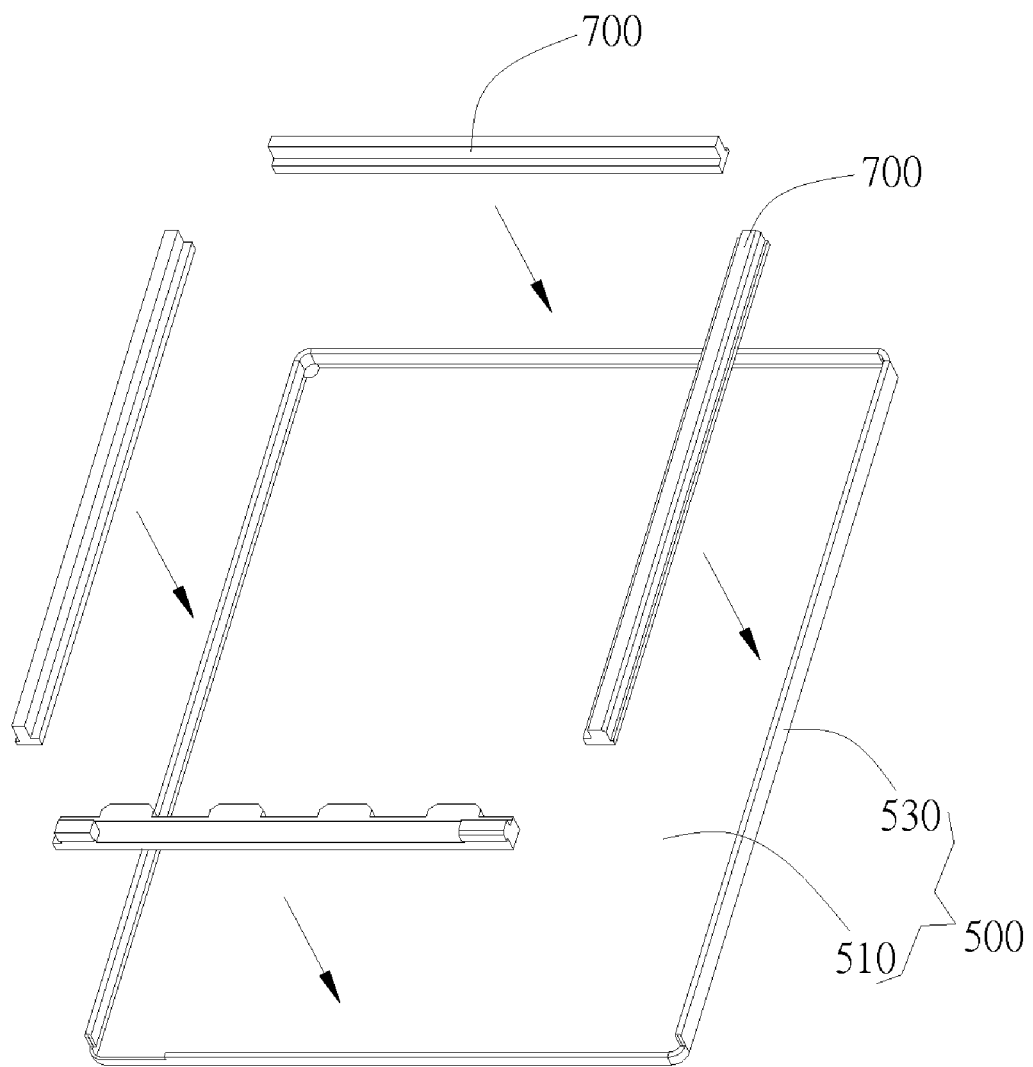
FIG. 5 schematically illustrates an embodiment of a non-continuous frame.

In the embodiment shown in FIG. 4a, the frame 700 has a complete and closed frame structure. However, in the embodiment shown in FIG. 5, the frame 700 may be disposed in a non-continuous manner. As shown in the figure, the frame 700 is divided into four segments corresponding to four sidewalls 530 of the back plate 500, respectively. Because one function of the frame 700 is to position the optical films, optical modules, or other devices thereon, even when the non-continuous arrangement is implemented, the frame 700 can still serve the purpose.

Figure 6A:
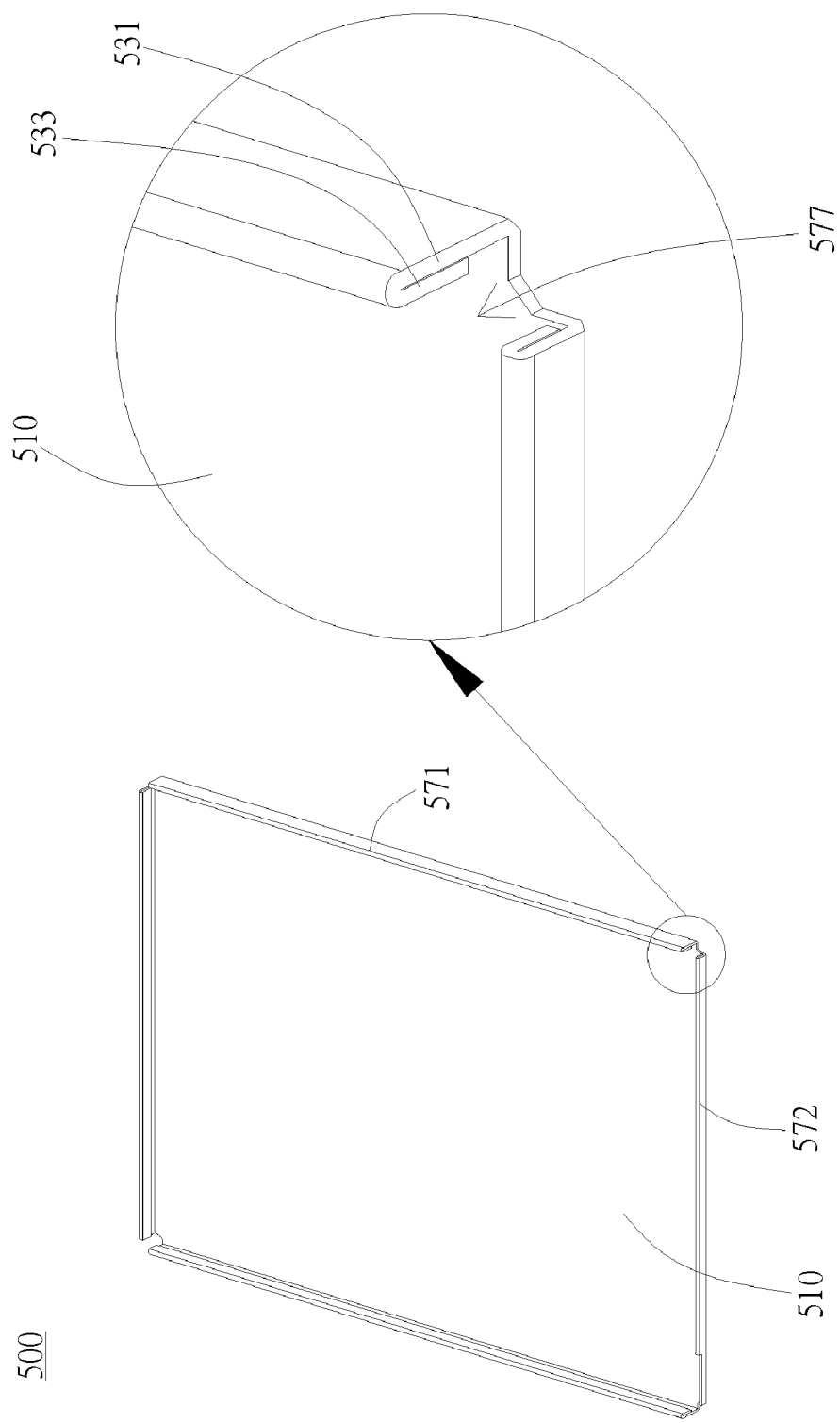
FIG. 6a schematically illustrates an embodiment of non-continuous sidewalls.
Figure 6B:
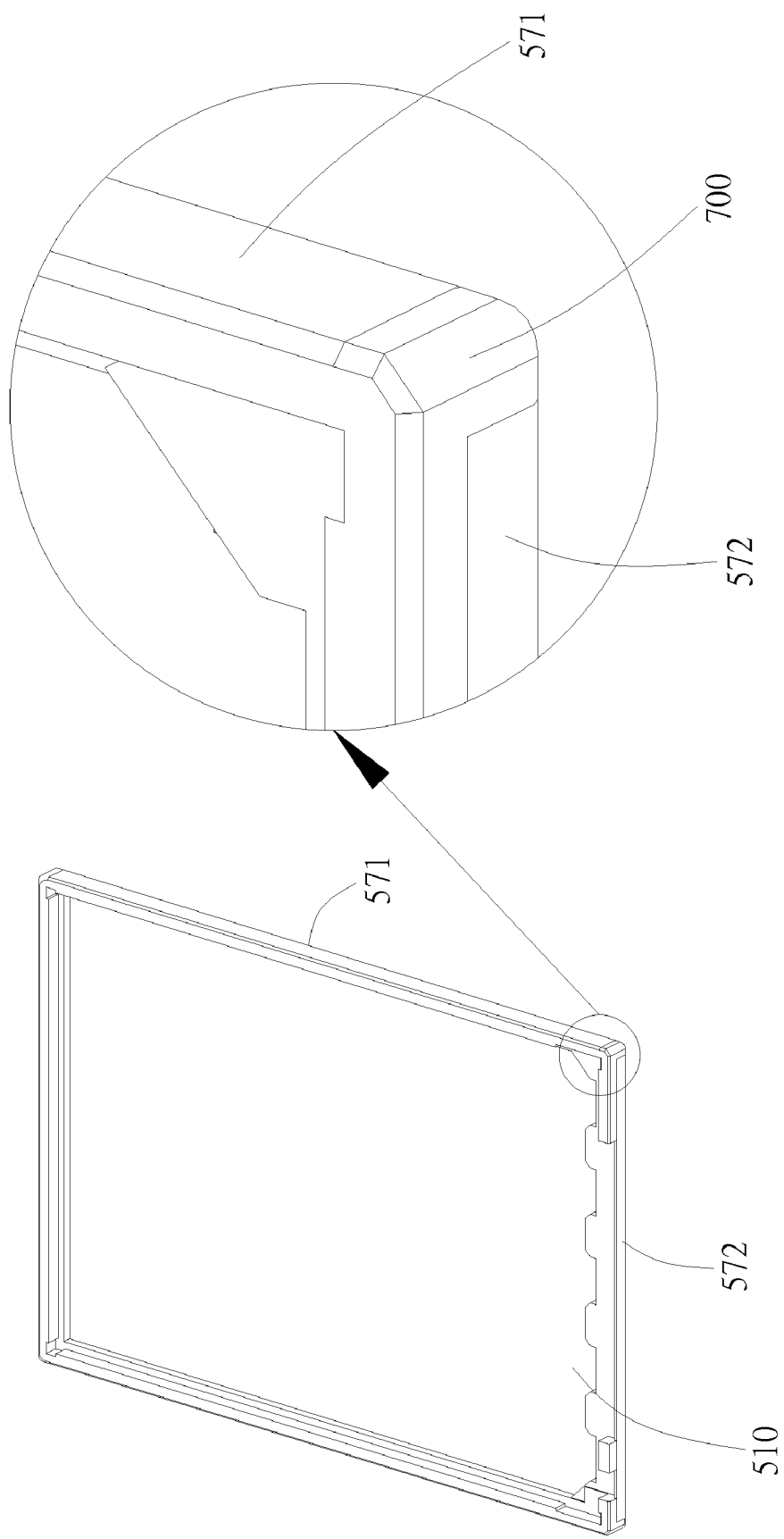
FIG. 6b schematically illustrates an embodiment of the assembly of the non-continuous sidewalls and the frame.

Furthermore, in the embodiment shown in FIG. 4a, four sidewalls 530 of the back plate 500 are connected to each other with no gap between the four sidewalls 530. However, in other embodiments, as shown in FIG. 6a, the back plate 500 includes a first sidewall 571 and a second sidewall 572 connected to two adjacent sides of the plate body 510. One end of the first sidewall 571 and one end of the second sidewall 572 are adjacent with a gap 577 therebetween. In other words, the gap 577 corresponds to the corner of the plate body 510. In the embodiment of FIG. 6b, when the frame 700 and the back plate 500 are assembled, a part of the frame 700 corresponding to the corner of the plate body 510 fills the gap 577 between the first sidewall 571 and the second sidewall 572. The engagement between the frame 700 and the gap 577 increases the contact area between the frame 700 and the back plate 500, so as to reduce the possibility of disassembly.

Figure 6C:
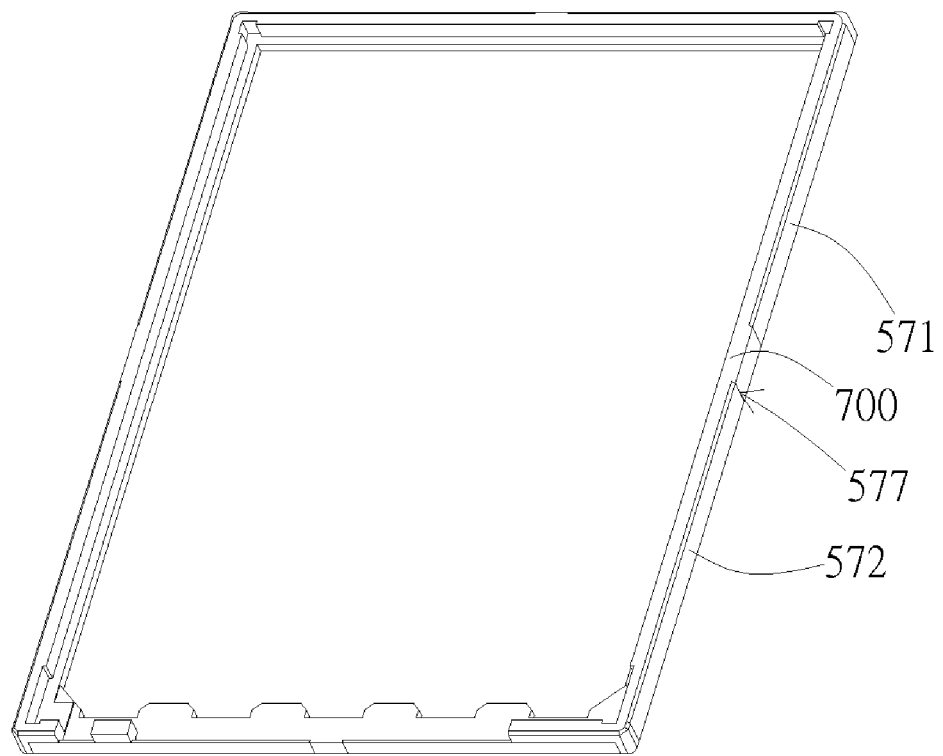
FIG. 6c schematically illustrates another embodiment of the assembly of the non-continuous sidewalls and the frame.

Moreover, in this embodiment, because the first sidewall 571 and the second sidewall 572 are connected to two adjacent sides of the plate body 510, an angle is included therebetween. However, in other embodiments, as illustrated in FIG. 6c, the first sidewall 571 and the second sidewall 572 can be disposed on the same side of the plate body 510. In this case, the first sidewall 571 and the second sidewall 572 are disposed on a same line. When the frame 700 and the back plate 500 are assembled, the frame 700 fills the gap 577 between the first sidewall 571 and the second sidewall 572.

Figure 7:
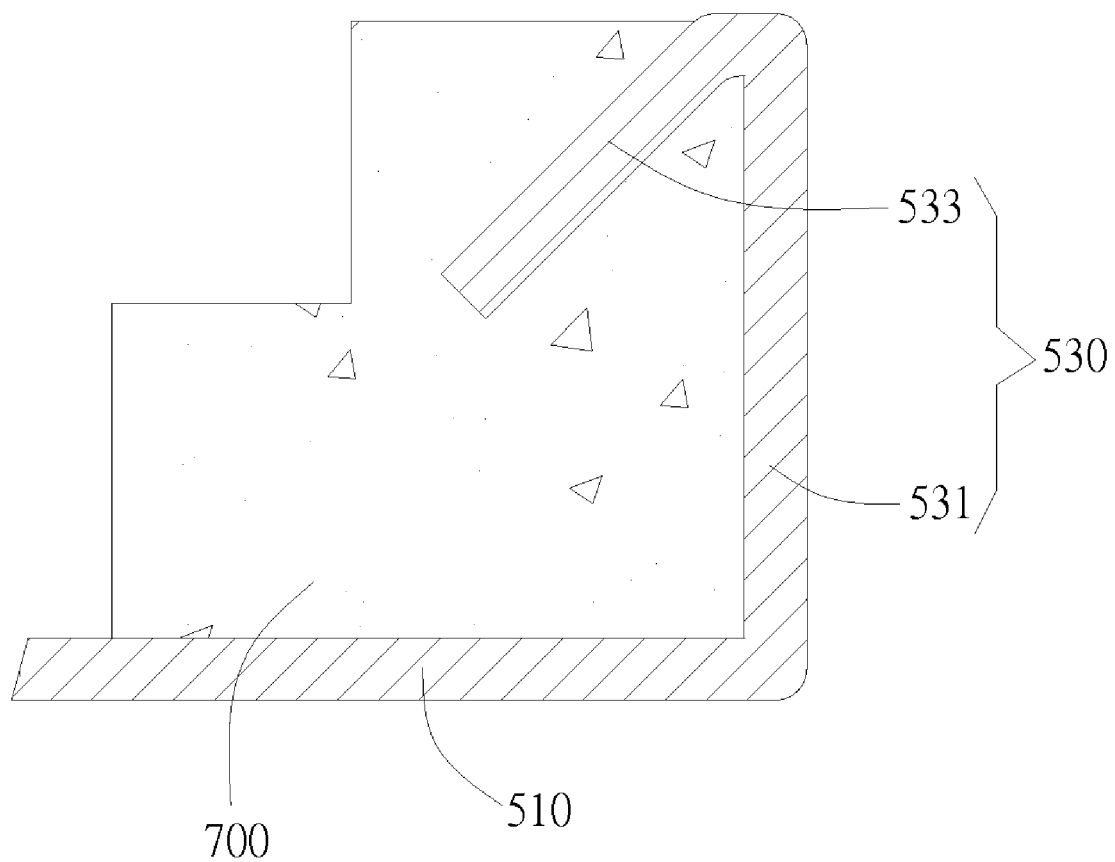
FIG. 7 schematically illustrates an embodiment of an included angle between the folding structure and the wall body.

In the embodiment of FIG. 7, the folding structure 533 of the sidewall 530 is not bent to be parallel to the wall body 531, but to include an angle that is less than 90 degrees with respect to the wall body 531. The groove 580 defined herein includes the space enclosed by the inner surface of the folding structure 533 and the wall body 531. When the frame 700 is formed on the back plate 500, a part of the frame 700 that corresponds to the sidewall 530 fills the groove 580, including the space enclosed by the inner side of the folding structure 533 and the wall body 531, and the space can be completely filled or partially filled. Because the arrangement of the folding structure 533 has the effect as a hook, the connection strength between the frame 700 and the back plate 500 can be further enhanced.

Figure 8:
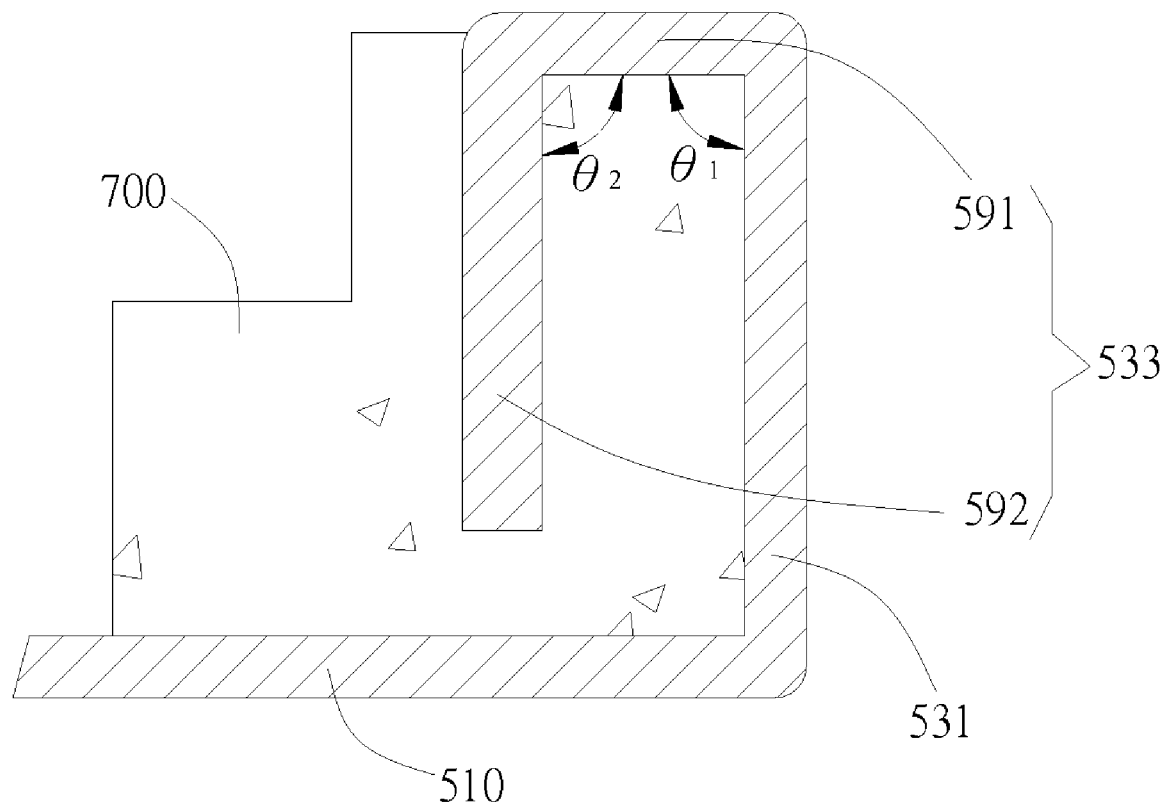
FIG. 8 schematically illustrates an embodiment including a first folding part and a second folding part.

In the embodiment of FIG. 8, the folding structure 533 may be divided into a first folding part 591 and a second folding part 592. The first folding part 591 is connected to the top of the wall body 531, and include a first angle θ1 with respect to the wall body 531. The second folding part 592 is connected to the other end of the first folding part 591 and includes a second angle θ2 with respect to the first folding part 591. The first angle θ1 is preferably less than or equal to 90 degrees, and the second angle θ2 is preferably larger or equal to 90 degrees. As illustrated in FIG. 8, in this embodiment, both angles θ1, θ2 are 90 degrees.

Figure 9A:
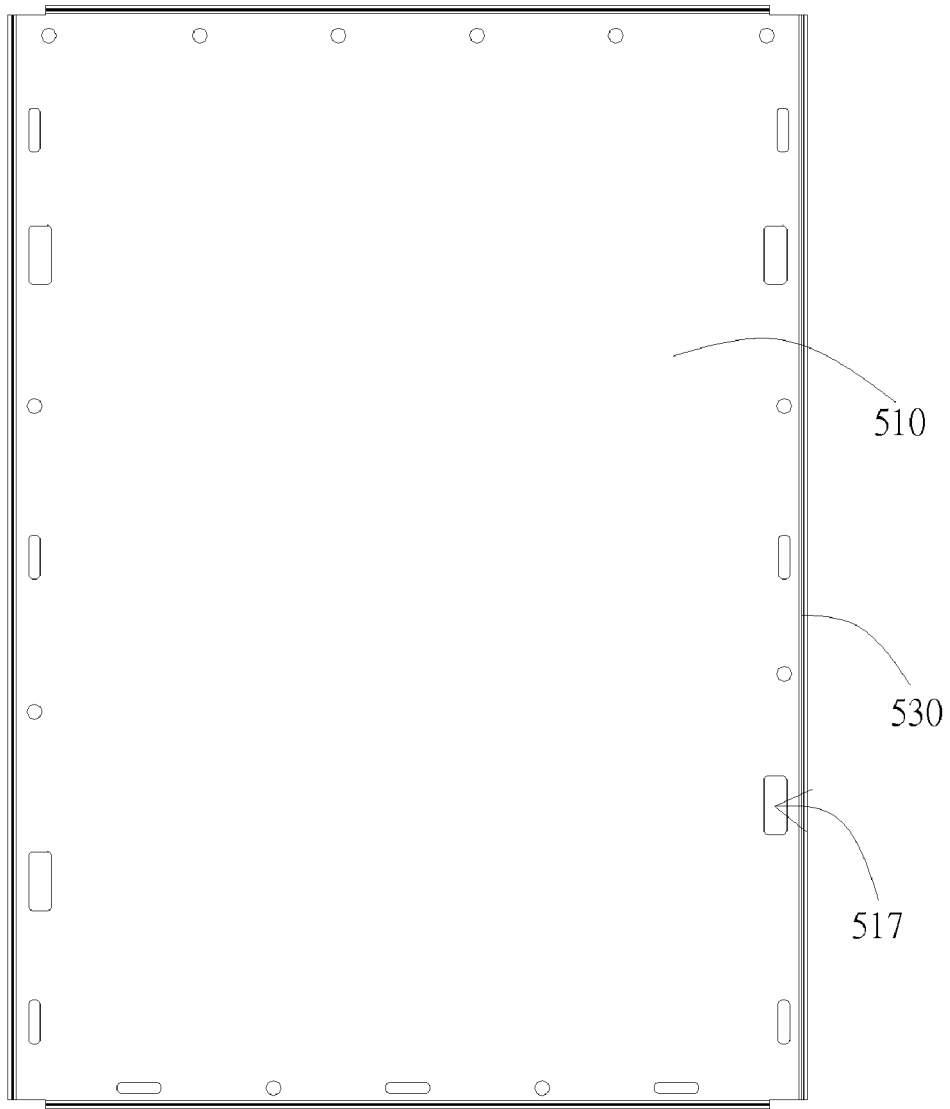
FIG. 9a schematically illustrates an embodiment of a back plate with connecting holes.

As shown in FIG. 9a, a portion of the plate body 510 close to the edge is provided with a plurality of connecting holes 517. The connecting holes 517 are all close to the sidewall 530 and distributed along the sidewall 530. Moreover, the distribution direction of the connecting holes 517 corresponds to that of the frame 700, and the connecting holes 517 are provided for the connection with the bottom of the frame 700. The connecting holes 517 are preferably formed by drilling through the plate body 510, and their shapes may be round, elliptical, rectangular, or other polygonal shapes. In a preferred embodiment, the frame 700 is formed on the back plate 500 through injection molding. That is, the back plate 500 is disposed in a mold, and the frame 700 is formed on the back plate 500 in the mold through an injection molding process. Through the engagement between the connecting hole 517 and the frame 700, the connection strength between the frame 700 and the back plate 500 is improved.

Figure 9B:
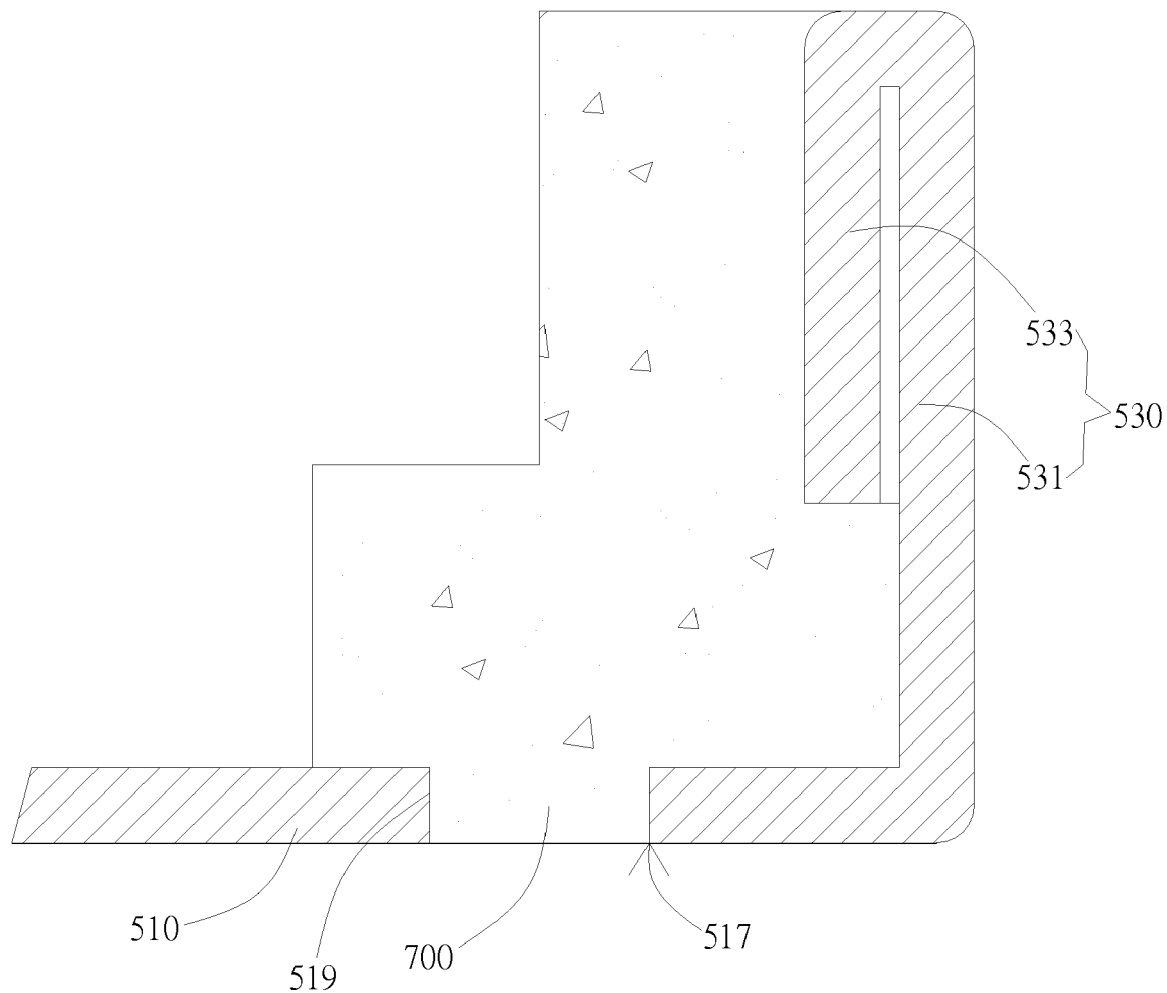
FIG. 9b is a cross-sectional view of an embodiment of the assembly of the back plate with connecting holes and the frame.
Figure 9C:
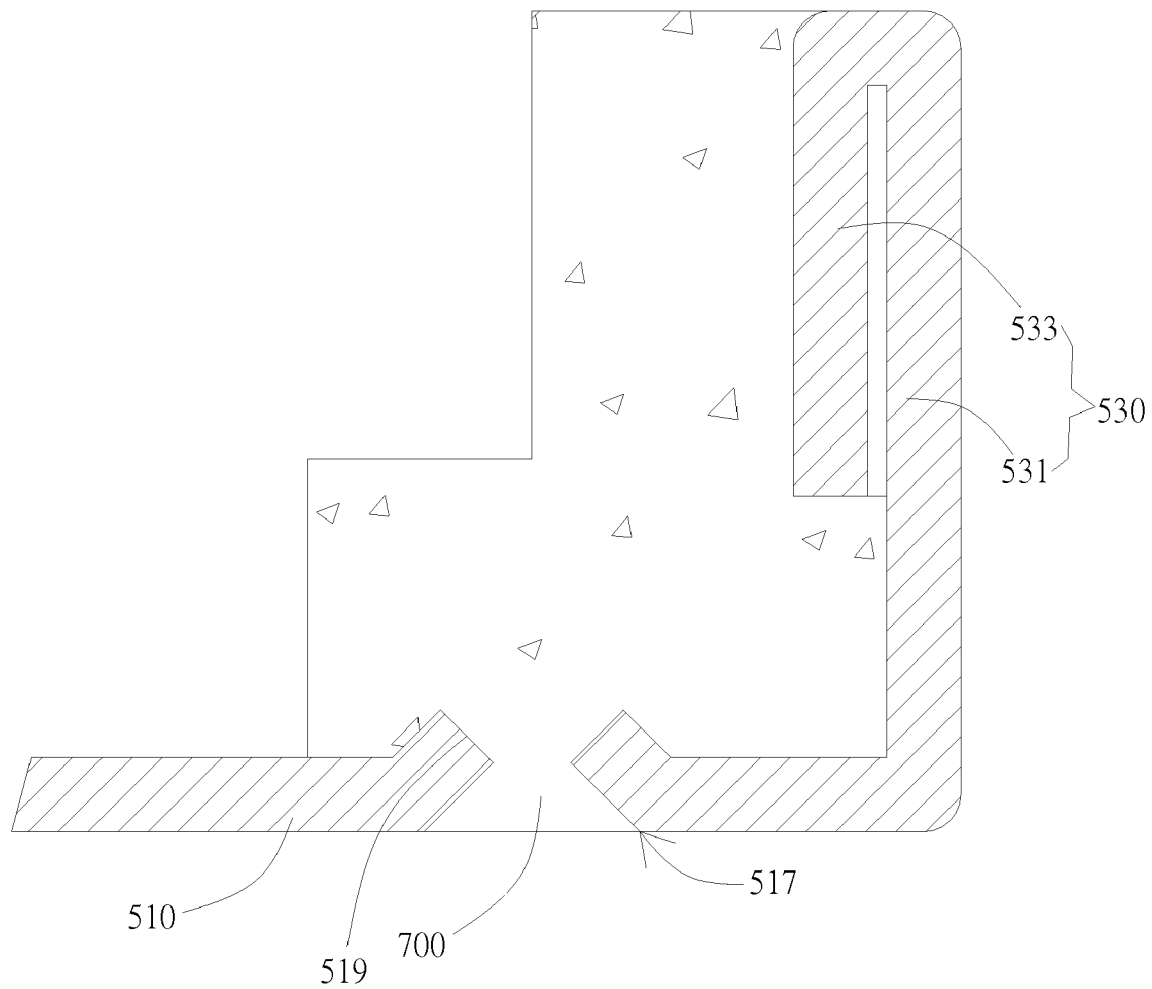
FIG. 9c is a cross sectional view of another embodiment of the assembly of the back plate with connecting holes and the frame.

As shown in FIG. 9b, the connecting hole 517 is a through-hole formed in the plate body 510, and an inner rim portion 519 of the plate body 510 surrounds the connecting hole 517. Moreover, in the embodiment of FIG. 9c, the inner rim portion 519 may be further bent toward the inner part of the back plate 500, and include an angle with respect to the plate 500. The bending angle of the inner rim portion 519 is preferably formed after the formation of the connecting holes 517. However, the bending of the inner rim portion 519 and the formation of the connecting holes 517 may be processed simultaneously. When the frame 700 is formed on the back plate 500, the part on the bottom of the frame 700 which is connected to the connecting hole 517 fills under the inner rim portion 519. In other words, the inner rim portion 519 is engaged with the frame 700. Through this design, the connection strength between the frame 700 and the back plate 500 can be improved.

Figure 10:
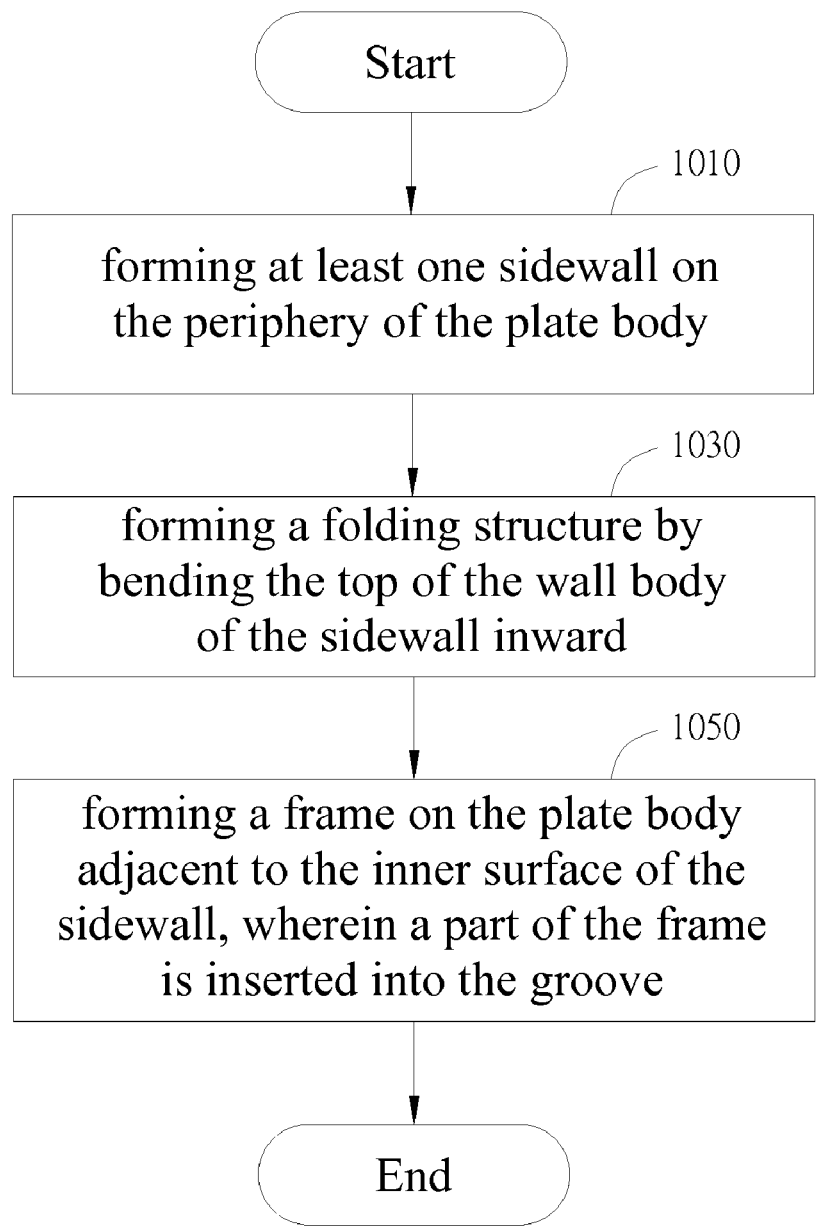
FIG. 10 is a flow chart of an embodiment of the manufacturing method of the base structure of the backlight module.

FIG. 10 illustrates a flow chart of a manufacturing method of the backlight module base. Step 1010 includes forming at least one sidewall on the periphery of the plate body. In a preferred embodiment, the sidewall is formed by cutting the plate body and bending it upward. However, in other embodiments, the sidewall may be formed on the plate body through molding, injection or other methods. Moreover, in another preferred embodiment, a first sidewall and a second sidewall may be formed on two adjacent sides of the plate body to include an angle. One end of the first sidewall and one end of the second sidewall are adjacent with a gap therebetween. However, in other embodiments, a single piece of continuous closed sidewall may be formed on the back plate to increase the structural strength of the back plate.

Step 1030 includes forming a folding structure by bending the top of the wall body of the sidewall inward. In another preferred embodiment, the top of the wall body is bent inward to be parallel to the original wall body. Meanwhile, a gap is formed between the folding structure and the plate body. In other words, the folding structure, the wall body and the plate body together enclose a groove. However, in other embodiments, the folding structure can be folded to include an angle that is less than 90 degrees with respect to the wall body 531. The groove includes a space enclosed by the inner surface of the folding structure and the wall body. Moreover, step 1030 can be further divided into: bending the wall body inward to form a first folding part with a first included angle with respect to the wall body, and further to bend the first folding part to form a second folding part with a second included angle with respect to the first folding part. In other words, the folding structure includes the first folding part and the second folding part. These two folding parts include different bending angles with respect to the wall 531, respectively. The first included angle is preferably less than or equal to 90 degrees, and the second included angle is preferably larger than or equal to 90 degrees.

Step 1050 includes forming a frame on the plate body adjacent to the inner surface of the sidewall, wherein a part of the frame is inserted into the groove. The frame is preferably formed into a continuous closed frame. However, one function of the frame is to position the optical films, optical modules, or other devices thereon. Therefore, even if the frame is disposed in a continuous closed manner, the frame can still serve for the purpose. The frame is preferably formed on the back plate through injection molding; including to place the back plate in a mold, and to form the frame on the back plate through injection molding, such that a part of the frame can be inserted into the groove. Through the engagement between the frame and the groove, the connection strength between the frame and the back plate can be improved. In this embodiment, the frame is preferably made from polycarbonate (PC), polystyrene (e.g. ABS), or other materials that can be shaped through injection molding. However, in other embodiments, the frame may be made first and then connected corresponding to the back plate. Moreover, in a preferred embodiment, the back side of the frame fully fills the space in the groove for a better connection. However in other embodiments, the space in the groove may be partially filled to produce a connection that is strong enough between the back plate and the frame.

Figure 11:
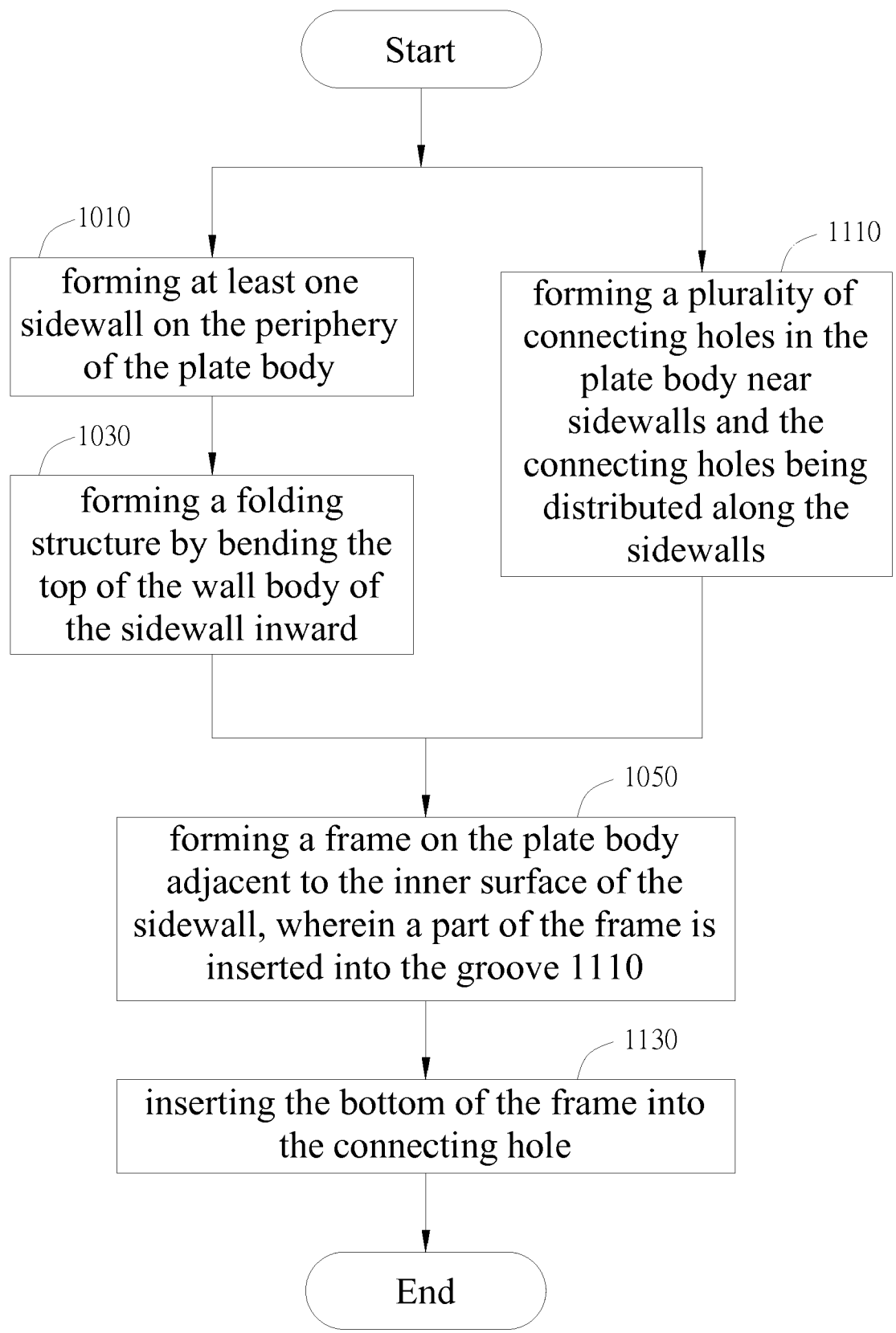
FIG. 11 is a flow chart of another embodiment of the manufacturing method of the backlight module base structure.

In the embodiment of FIG. 11, the manufacturing method of the base of the backlight module further includes step 1110, forming a plurality of connecting holes in the plate body near sidewalls. The connecting holes are distributed along the sidewalls. The method further includes step 1130, inserting the bottom of the frame into the connecting hole. The connecting holes are preferably formed by directly drilling through the plate body and the shapes of the connecting holes may be round, elliptical, rectangular, or other polygonal. In a preferred embodiment, the frame is formed on the back plate through injection molding, including to dispose the back plate 500 in a mold and to form the frame on the back plate 500 in the mold through injection molding. The bottom of the frame after the injection molding process will be inserted into the connecting holes. Through the engagement between the connecting holes and the bottom of the frame, the connection strength between the frame and the back plate can be improved.

Moreover, in a preferred embodiment, an inner rim portion that surrounds the connecting holes may be bent toward the inner part of the back plate with an included angle with respect to the plate body. The bending angle of the inner rim portion is preferably formed after forming the connecting holes. However, the bending of the inner rim portion and the forming of the connecting holes may be processed. When the frame is formed on the back plate, a part of the bottom of the frame in the connecting holes fills under the inner rim portion. In other words, the inner rim portion is engaged with the frame. Through this design, the connection strength between the frame and the back plate can be improved.

This invention has been described in accordance with the embodiments above; however, the embodiments above are only exemplary. What needs to point out is that the embodiments disclosed are not intended to limit the scope of this invention. In contrast, the modifications and the equivalents included in the spirit and the scope of this invention are all included in the scope of this invention.

What is claimed is:

1. A backlight module, comprising:
   a back plate having a plate body and at least one sidewall, the sidewall having a wall body and a folding structure bending from the top of the wall body, the folding structure, the wall body and the plate together enclosing a groove; and
   a frame, formed on the plate body adjacent to an inner side of the sidewall, a part of the frame being embedded into the groove.

2. The backlight module of claim 1, wherein the part of the frame fills the groove.

3. The backlight module of claim 1, wherein the frame is formed into a continuous frame.

4. The backlight module of claim 1, wherein the frame is formed into a non-continuous frame.

5. The backlight module of claim 1, wherein the plate body has a plurality of holes formed in the plate body close to the sidewall, the holes being distributed along the sidewall, and the bottom of the frame is inserted into the holes.

6. The backlight module of claim 5, wherein the plate body has an inner rim portion formed on the periphery of the hole, the inner rim portion being bent inward towards the back plate to include an angle with the plate body, and a part of the bottom of the frame fills under the inner rim portion.

7. The backlight module of claim 5, wherein the hole has a shape selected from circular, elliptical, rectangular, and polygonal.

8. The backlight module of claim 1, wherein the folding structure is bent parallel to the wall body.

9. The backlight module of claim 1, wherein the folding structure is bent to form an angle less than 90 degrees with respect to the sidewall, and a part of the frame fills between the folding structure and the wall body.

10. The backlight module of claim 1, wherein the folding structure includes a first folding part and a second folding part, the first folding part being connected to the top of the wall body forming a first angle with respect to the wall body; and the second folding part is connected to the first folding part forming a second angle with respect to the first folding part.

11. The backlight module of claim 1, wherein the at least one sidewall includes a first sidewall and a second sidewall, one end of the first sidewall and one end of the second sidewall being adjacent with a gap therebetween, and a part of the frame fills the gap.

12. The backlight module of claim 11, wherein the first sidewall and the second sidewall are located on two adjacent sides of the plate body respectively, and the first sidewall and the second sidewall form an angle.

13. A method of manufacturing a base structure of a backlight module, comprising:
   forming at least one sidewall on periphery of a plate body;
   bending from the top of a wall body of the sidewall to form a folding structure, wherein the folding structure, the wall body, and the plate body together enclose a groove; and
   forming a frame on the plate body adjacent to an inner surface of the sidewall, a part of the frame being embedded into the groove.

14. The method of manufacturing a base structure of a backlight module of claim 13, wherein the step of forming the frame includes filling the groove with the part of the frame.

15. The method of manufacturing a base structure of a backlight module of claim 13, wherein the step of forming the frame includes forming the frame into a continuous frame.

16. The method of manufacturing a base structure of a backlight module of claim 13, wherein the step of forming the frame includes forming the frame into a non-continuous frame.

17. The method of manufacturing a base structure of a backlight module of claim 13, further comprising:
   forming a plurality of connecting holes in the plate body close to the sidewall, wherein the connecting holes are distributed along the sidewall, and
   the bottom of the frame is connected to the connecting holes.

18. The method of manufacturing a base structure of a backlight module of claim 17, wherein the step of forming the connecting holes includes bending an inner rim portion of the plate body surrounding the connecting hole towards an inner part of the back plate, so as to include an angle with respect to the plate body.

19. The method of manufacturing a base structure of a backlight module of claim 13, wherein the step of forming the folding structure includes bending the folding structure to be parallel to the sidewall.

20. The method of manufacturing a base structure of a backlight module of claim 13, wherein the step of forming the folding structure includes bending the folding structure inwards to include an angle that is less than 90 degrees with respect to the wall body, and the step of forming the frame includes filling the part of the frame between the folding structure and the wall body.

21. The method of manufacturing a base structure of a backlight module of claim 13, wherein the step of forming the folding structure includes:
   bending the sidewall inwards to form a first folding part with a first included angle with respect to the sidewall; and
   bending the first bending part inwards to form a second folding part with a second included angle with respect to the first folding part.

22. The method of manufacturing a base structure of a backlight module of claim 13, wherein the step of forming at least one sidewall includes forming a first sidewall and a second sidewall on the plate body, and one end of the first sidewall and one end of the second sidewall are adjacent with a gap therebetween, and wherein the step of forming the frame including filling a part of the frame in the gap.

23. The method of manufacturing a base structure of a backlight module of claim 22, wherein the step of forming the first sidewall and the second sidewall includes forming the first sidewall and the second sidewall on two sides of the plate body, and the first sidewall and the second sidewall forms an angle.

24. The method of manufacturing a base structure of a backlight module of claim 13, wherein the step of forming the frame includes forming the frame on the plate body by an injection molding process.

* * * * *